(12) United States Patent
Kakuta (10) Patent No.: US 10,293,899 B2
(45) Date of Patent: May 21, 2019

(54) DEVICE, PROGRAM AND RECORDING MEDIUM FOR SUPPORTING ANALYSIS OF FUEL CONSUMPTION IN VOYAGE OF SHIP

(71) Applicant: NIPPON YUSEN KABUSHIKI KAISHA, Tokyo (JP)

(72) Inventor: Ryo Kakuta, Tokyo (JP)

(73) Assignee: Nippon Yusen Kabushiki Kaisha, Tokyo (JP)

( * ) Notice: Subject to any disclaimer, the term of this patent is extended or adjusted under 35 U.S.C. 154(b) by 165 days.

(21) Appl. No.: 15/027,719

(22) PCT Filed: Oct. 7, 2013

(86) PCT No.: PCT/JP2013/077239
§ 371 (c)(1),
(2) Date: Apr. 7, 2016

(87) PCT Pub. No.: WO2015/052751
PCT Pub. Date: Apr. 16, 2015

(65) Prior Publication Data
US 2016/0236758 A1    Aug. 18, 2016

(51) Int. Cl.
*B63B 49/00* (2006.01)
*G01C 21/20* (2006.01)
(Continued)

(52) U.S. Cl.
CPC .............. *B63B 49/00* (2013.01); *G01C 21/20* (2013.01); *G01F 9/02* (2013.01); *G01S 19/10* (2013.01); *B63B 2213/02* (2013.01)

(58) Field of Classification Search
None
See application file for complete search history.

(56) References Cited

U.S. PATENT DOCUMENTS

2005/0143876 A1   6/2005 Tanase
2009/0187450 A1*  7/2009 Kocis ................. G06Q 10/0831
                                                     705/331
(Continued)

FOREIGN PATENT DOCUMENTS

JP    2004025914 A    1/2004
JP    2005016443 A    1/2005
JP    2010267184 A    11/2010

OTHER PUBLICATIONS

Witten Opinion issued in corresponding PCT Application No. PCT/JP2013/077239, dated Jan. 7, 2014, pp. 1-6.
(Continued)

*Primary Examiner* — James M McPherson
(74) *Attorney, Agent, or Firm* — MKG, LLC (57) ABSTRACT

An acquisition unit acquires weather and marine data indicating a ship voyage schedule that serves as a reference, actual performance data, fuel consumption data, and weather and marine conditions the ship has encountered during a voyage. A time difference data generation unit calculates the difference between the time indicated by the reference data and the time indicated by the actual performance data for each of the journeys between ports. Projected fuel consumption calculation unit calculates projected fuel consumption for each of the journeys between ports based on the reference data, weather and marine data and fuel consumption data. Fuel consumption difference data generation unit calculates the difference between the projected fuel consumption and the actual fuel consumption amount indicated by the actual performance data for each of the journeys between ports.

7 Claims, 8 Drawing Sheets

(51) Int. Cl.
*G01F 9/02* (2006.01)
*G01S 19/10* (2010.01)

(56) References Cited

U.S. PATENT DOCUMENTS

| | | | | |
|---|---|---|---|---|
| 2011/0054979 A1* | 3/2011 | Cova | ................. | G06Q 10/06 |
| | | | | 705/7.37 |
| 2012/0259489 A1* | 10/2012 | Hamamatsu | ........... | B63H 25/04 |
| | | | | 701/21 |
| 2014/0180566 A1* | 6/2014 | Malhotra | ................. | G08G 3/02 |
| | | | | 701/300 |
| 2015/0149074 A1* | 5/2015 | Lepisto | ................. | G01C 21/20 |
| | | | | 701/410 |

OTHER PUBLICATIONS

International Search Report issued in corresponding PCT Application No. PCT/JP2013/077239 dated Jan. 7, 2014, pp. 1-2.

* cited by examiner

SHIP ID "ABC" / ROUTE ID "1234"     TABLE OF REFERENCE VALUES FOR TRAVEL

| TRAVEL SEGMENT | SAILING DISTANCE (miles) | SAILING TIME (hours) | SAILING SPEED (knots) |
|---|---|---|---|
| A − B | 190 | 13.5 | 13.5 |
| B − C | 3700 | 200.0 | 200.0 |
| C − D | 1400 | 85.0 | 85.0 |
| D − E | 700 | 46.0 | 46.0 |
| E − A | 150 | 12.5 | 12.5 |

TABLE OF REFERENCE VALUES WHILE IN PORT OF CALL

| PORT | IN-PORT SHIP OPERATION TIME (hours) | MOORING TIME (hours) |
|---|---|---|
| A | 2.0 (DEPARTURE) | − |
| B | 2.0 (ARRIVAL)<br>2.0 (DEPARTURE) | 8.0 |
| C | 1.0 (ARRIVAL)<br>1.0 (DEPARTURE) | 25.0 |
| D | 2.0 (ARRIVAL)<br>2.0 (DEPARTURE) | 17.5 |
| E | 2.0 (ARRIVAL)<br>2.0 (DEPARTURE) | 20.0 |
| A | 2.0 (ARRIVAL) | − |

FIG. 4

SHIP ID "ABC"

| WIND DIRECTION | WIND SPEED | WAVE HEIGHT | WAVE DIRECTION | WAVE PERIOD | TIDE SPEED | TIDE DIRECTION | DRAUGHT | TRIM | SPEED OVER GROUND | FUEL CONSUMPTION |
|---|---|---|---|---|---|---|---|---|---|---|
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

*FIG. 5*

VOYAGE ID "XYZ" / SHIP ID "ABC" / ROUTE ID "1234"

TABLE OF ACTUAL PERFORMANCE DURING TRAVEL

| TRAVEL SEGMENT | WIND DIRECTION | WIND SPEED | WAVE HEIGHT | WAVE DIRECTION | WAVE PERIOD | TIDE SPEED | TIDE DIRECTION | DRAUGHT | TRIM | SAILING DISTANCE | SAILING TIME | FUEL CONSUMPTION |
|---|---|---|---|---|---|---|---|---|---|---|---|---|
| A – B | ... | ... | ... | ... | ... | ... | ... | ... | ... | 192.0 | 11.5 | 50.2 |
| B – C | ... | ... | ... | ... | ... | ... | ... | ... | ... | 3802.0 | 215.2 | 772.8 |
| C – D | ... | ... | ... | ... | ... | ... | ... | ... | ... | 1311.0 | 71.2 | 1071.3 |
| D – E | ... | ... | ... | ... | ... | ... | ... | ... | ... | 664.0 | 37.8 | 1222.8 |
| E – A | ... | ... | ... | ... | ... | ... | ... | ... | ... | 152.0 | 9.0 | 1296.3 |

TABLE OF ACTUAL VALUES WHILE IN PORT OF CALL

| PORT | IN-PORT SHIP OPERATION TIME (hours) | MOORING TIME (hours) |
|---|---|---|
| A | 1.2 (DEPARTURE) | – |
| B | 1.8 (ARRIVAL) / 1.8 (DEPARTURE) | 10.9 |
| C | 2.9 (ARRIVAL) / 2.7 (DEPARTURE) | 32.0 |
| D | 2.6 (ARRIVAL) / 2.6 (DEPARTURE) | 17.1 |
| E | 1.5 (ARRIVAL) / 1.4 (DEPARTURE) | 19.3 |
| A | 1.2 (ARRIVAL) | – |

TABLE OF ACTUAL EVENT TIMES

| EVENT | TIMING |
|---|---|
| LEAVING SHORE OF PORT "A" | 2013/4/1 13:00 |
| DEPARTURE FROM PORT "A" | 2013/4/1 14:12 |
| ARRIVAL AT PORT "B" | 2013/4/2 01:42 |
| DOCKING AT PORT "B" | 2013/4/2 03:30 |
| LEAVING SHORE OF PORT "B" | 2013/4/2 14:24 |
| ⋮ | ⋮ |

FIG. 6

TIME RANGE "2013/4/1 12:00 - 2013/4/2 01:30"
"SEA AREA A-B"

| WIND DIRECTION | WIND SPEED | WAVE HEIGHT | WAVE DIRECTION | WAVE PERIOD | TIDE SPEED | TIDE DIRECTION |
|---|---|---|---|---|---|---|
| ... | ... | ... | ... | ... | ... | ... |

*FIG. 7*

|  | TIME | | | FUEL CONSUMPTION | | | | TIME DIFFERENCE | |
|---|---|---|---|---|---|---|---|---|---|
|  | REFERENCE | ACTUAL | DIFFERENCE | REFERENCE | ACTUAL | DIFFERENCE | ACCUMULATION | | |
| DELAY OF DEPARTURE FROM PORT "A" | 0.0 | 3.0 | 3.0 |  |  |  |  | 3.00 | LEAVING SHORE OF PORT "A" |
| TIME SPENT LEAVING SHORE OF PORT "A" | 2.0 | 1.2 | -0.8 |  |  |  |  | 2.20 | DEPARTURE FROM PORT "A" |
| TIME SPENT SAILING FROM PORT "A" TO PORT "B" | 13.5 | 11.5 | -2.0 | 42.2 | 50.2 | 8.0 | 8.0 | 0.20 | ARRIVAL AT PORT "B" |
| TIME SPENT DOCKING FOR PORT "B" | 2.0 | 1.8 | -0.2 |  |  |  |  | 0.00 | DOCKING AT PORT "B" |
| TIME SPENT MOORING AT PORT "B" | 8.0 | 10.9 | 2.9 |  |  |  |  | 2.90 | LEAVING SHORE OF PORT "B" |
| TIME SPENT LEAVING SHORE OF PORT "B" | 2.0 | 1.8 | -0.2 |  |  |  |  | 2.70 | DEPARTURE FROM PORT "B" |
| TIME SPENT SAILING FROM PORT "B" TO PORT "C" | 200.0 | 215.2 | 15.2 | 777.7 | 722.6 | -55.1 | -47.1 | 17.90 | ARRIVAL AT PORT "C" |
| TIME SPENT DOCKING FOR PORT "C" | 1.0 | 2.9 | 1.9 |  |  |  |  | 19.80 | DOCKING AT PORT "C" |
| TIME SPENT MOORING AT PORT "C" | 25.0 | 32.0 | 7.0 |  |  |  |  | 26.80 | LEAVING SHORE OF PORT "C" |
| TIME SPENT LEAVING SHORE OF PORT "C" | 1.0 | 2.7 | 1.7 |  |  |  |  | 28.50 | DEPARTURE FROM PORT "C" |
| TIME SPENT SAILING FROM PORT "C" TO PORT "D" | 85.0 | 71.2 | -13.8 | 245.5 | 298.5 | 53.0 | 5.9 | 14.70 | ARRIVAL AT PORT "D" |
| TIME SPENT DOCKING FOR PORT "D" | 2.0 | 2.6 | 0.6 |  |  |  |  | 15.30 | DOCKING AT PORT "D" |
| TIME SPENT MOORING AT PORT "D" | 17.5 | 17.1 | -0.4 |  |  |  |  | 14.90 | LEAVING SHORE OF PORT "D" |
| TIME SPENT LEAVING SHORE OF PORT "D" | 2.0 | 2.6 | 0.6 |  |  |  |  | 15.50 | DEPARTURE FROM PORT "D" |
| TIME SPENT SAILING FROM PORT "D" TO PORT "E" | 46.0 | 37.8 | -8.2 | 127.2 | 151.5 | 24.3 | 30.2 | 7.30 | ARRIVAL AT PORT "E" |
| TIME SPENT DOCKING FOR PORT "E" | 2.0 | 1.5 | -0.5 |  |  |  |  | 6.80 | DOCKING AT PORT "E" |
| TIME SPENT MOORING AT PORT "E" | 20.0 | 19.3 | -0.7 |  |  |  |  | 6.10 | LEAVING SHORE OF PORT "E" |
| TIME SPENT LEAVING SHORE OF PORT "E" | 2.0 | 1.4 | -0.6 |  |  |  |  | 5.50 | DEPARTURE FROM PORT "E" |
| TIME SPENT SAILING FROM PORT "E" TO PORT "A" | 12.5 | 9.0 | -3.5 | 60.3 | 73.5 | 13.2 | 43.4 | 2.00 | ARRIVAL AT PORT "A" |
| TIME SPENT DOCKING FOR PORT "A" | 2.0 | 1.2 | -0.8 |  |  |  |  | 1.20 | DOCKING AT PORT "A" |

DEVICE, PROGRAM AND RECORDING MEDIUM FOR SUPPORTING ANALYSIS OF FUEL CONSUMPTION IN VOYAGE OF SHIP

TECHNICAL FIELD

The present invention pertains to a technology for supporting analysis of fuel consumption amount in the voyage of a ship.

BACKGROUND ART

An amount of fuel consumed by a vehicle such a ship changes in accordance with a distance traveled, speed of travel and the like by the ship. To minimize an amount of fuel consumed by a vehicle such as a ship and thereby restrain costs, it is necessary to understand causes of any increase or decrease in fuel consumption of the vehicle.

JP2010-267184A discloses a technology that meets the object stated above. Specifically, JP2010-267184A discloses a technique for calculating an influence of factors pertaining to fuel expenses over a prescribed period of time, and calculating a cost difference between fuel expenses when one factor is replaced by another factor operative within a prescribed period of time, whereby a comparison of the influence of such factors can be evaluated in an effect on fuel consumption of a vehicle, such as a ship. In this instance, the term "factors" used in relation to fuel expenses are: fuel consumption; unit fuel price; and speed of travel.

Generally a voyage of a ship occurs from one port to another, with a time of departure from a port of departure and a time of arrival at a destination ports being estimated so as to enable an overall sail time to be approximately determined. However, once a ship reaches a destination port a variety of factors may affect a time that the ship spends at that destination port; for example, skill of a pilot in guiding the ship into the destination port, congestion at the port, and unload and load speed at the port may each cause a mooring time of the ship to increase. As a result, a time used as a basis for a voyage of a ship between ports is subject to variance and a relay time for the ship to proceed may increase. In such a case, a time provided for further passage of the ship becomes shorter in proportion to the length of the delay at the destination (relay) port, and as a result a speed at which the ship must proceed from the destination (relay) port will need to be increased. If a speed of travel of the ship is increased an amount of fuel consumed over a set sailing distance also will increase.

Further, factors such as weather and marine conditions may also cause an increase in fuel consumption by the ship. A ship navigator determines a speed of travel of a ship between ports and performs a voyage by taking into account such conditions, but when an amount of fuel consumption required for a voyage differs from a planned or predicted amount of fuel consumption, a ship operation manager, a ship navigator or the like will wish to ascertain why a difference in planned or predicted fuel consumption has occurred.

SUMMARY

In view of at least the issues stated above, it is an object of the present invention to determine in a voyage of a ship those factors that give rise to a disparity in a projected amount of fuel consumption and an actual amount of fuel consumed during a voyage of a ship.

To solve the problem stated above, the present invention provides a device comprising: an acquisition unit that acquires, for a voyage of a ship including mooring at one or more relay ports between a departure port and a destination port, data indicating: a projected travel time between ports; a projected mooring time at a relay port; projected fuel consumption data required for travel between ports; an actual travel time between ports; an actual mooring time at a relay port; actual fuel consumption data when the ship travels between ports; and distance between ports, a time difference data generation unit that generates time difference data indicating the difference between the projected travel time and the actual travel time and the difference between the projected mooring time and the actual mooring time based on the data acquired by the acquisition unit, a fuel consumption difference data generation unit that generates data indicating the difference between the projected fuel consumption data and the actual fuel consumption data based on the data acquired by the acquisition unit, and an output unit that outputs data indicated by the time difference data and the difference in fuel consumption indicated by the fuel consumption difference data.

In the above-described device, a configuration may be adopted in which the acquisition unit acquires data indicating an amount of fuel consumption according to a speed of the ship, and a projected fuel consumption calculation unit that calculates the projected fuel consumption based on the projected travel time, the distance between the ports and the fuel consumption according to speed indicated by the data acquired by the acquisition unit is provided.

Further, in the above-described device, a configuration may be adopted in which data indicating the fuel consumption according to speed indicates fuel consumption according to speed in each of various weather or marine conditions, the acquisition unit acquires data indicating weather or marine conditions anticipated in the voyage, and the projected fuel consumption calculation unit calculates the projected fuel consumption based on the fuel consumption according to speed corresponding to weather or marine conditions anticipated in the voyage indicated by the data acquired by the acquisition unit.

Further, in the above-described device, a configuration may be adopted in which the acquisition unit acquires data indicating fuel consumption according to a speed of the ship, and an actual fuel consumption calculation unit that calculates the actual fuel consumption based on the actual travel time, the distance between the ports and the fuel consumption according to speed indicated by the data acquired by the acquisition unit is provided.

Further, in the above-described device, a configuration may be adopted in which the data indicating the fuel consumption according to speed indicates fuel consumption according to speed in each of various weather or marine conditions, the acquisition unit acquires data indicating weather or marine conditions in the voyage, and the actual fuel consumption calculation unit calculates the actual fuel consumption based on the fuel consumption according to speed corresponding to the weather or marine conditions in the voyage indicated by the data acquired by the acquisition unit.

Further, the present invention is provided with a program for causing a computer to execute: a process for acquiring, for a voyage of a ship including mooring at one or more relay ports between a departure port and destination port, data indicating a projected travel time between ports, a projected mooring time at a relay port, projected fuel consumption which is fuel consumption required for travel between ports, an actual travel time between ports, an actual mooring time at a relay port, actual fuel consumption required for travel between ports, and distance between ports, a process for generating data of a time difference between the projected travel time and the actual travel time and the difference between the projected mooring time and the actual mooring time based on data acquired in the process for acquiring, a process for generating fuel consumption difference data indicating the difference between the projected fuel consumption data and the actual fuel consumption data based on the data acquired in the process for acquiring, and a process for outputting data indicated by the time difference data and the difference in fuel consumption indicated by the fuel consumption difference data.

Further, the present invention is provided with a computer-readable recording medium that continuously records a program for causing a computer to execute: a process for acquiring, for a voyage of a ship including mooring at one or more relay ports between a departure port and destination port, data indicating a projected travel time between ports, a projected mooring time at a relay port, projected fuel consumption which is fuel consumption required for travel between ports, an actual travel time between ports, an actual mooring time at a relay port, actual fuel consumption required for travel between ports, and distance between ports, a process for generating data of a time difference between the projected travel time and the actual travel time and the difference between the projected mooring time and the actual mooring time based on data acquired in the process for acquiring, a process for generating fuel consumption difference data indicating the difference between the projected fuel consumption data and the actual fuel consumption data based on the data acquired in the process for acquiring, and a process for outputting data indicated by the time difference data and the difference in fuel consumption indicated by the fuel consumption difference data.

Further, the present invention is provided with a method comprising: a step for acquiring, for a voyage of a ship including mooring at one or more relay ports between a departure port and destination port, data indicating a projected travel time between ports, a projected mooring time at a relay port, projected fuel consumption which is fuel consumption required for travel between ports, an actual travel time between ports, an actual mooring time at a relay port, actual fuel consumption required for travel between ports, and distance between ports, a step for generating data of a time difference between the projected travel time and the actual travel time and the difference between the projected mooring time and the actual mooring time based on data acquired in the step for acquiring, a step for generating fuel consumption difference data indicating the difference between the projected fuel consumption data and the actual fuel consumption data based on the data acquired in the step for acquiring, and a step for outputting data indicated by the time difference data and the difference in fuel consumption indicated by the fuel consumption difference data.

According to the present invention, since data indicating the difference between the actual time required for travel between ports and mooring at ports and the projected time, and the difference between actual fuel consumption projected fuel consumption that serves as a reference in the voyage of a ship that includes mooring at one or more ports is output, a user such as a ship operation manager or a ship navigator can ascertain a relationship between time allocation and fuel consumption amount in the travel between ports and mooring at ports. As a result, a user can ascertain at least some of the factors causing a disparity between projected fuel consumption and actual fuel consumption required for a voyage.

BRIEF EXPLANATION OF THE DRAWINGS

FIG. 8 A drawing exemplifying output data generated by the terminal device as in one embodiment.

DETAILED DESCRIPTION

1. Embodiment

The configuration and operation of a fuel consumption analysis support system 1 as in one embodiment of the present invention is explained below. Fuel consumption analysis support system 1 is a system that supports a user such as a ship operation manager or a ship navigator to ascertain the relevance, after a ship has performed a voyage including mooring at one or more ports, between fuel consumption during a voyage and the time allocation that was necessary for travel between ports, mooring at ports and the like during the voyage.

Figure 1:
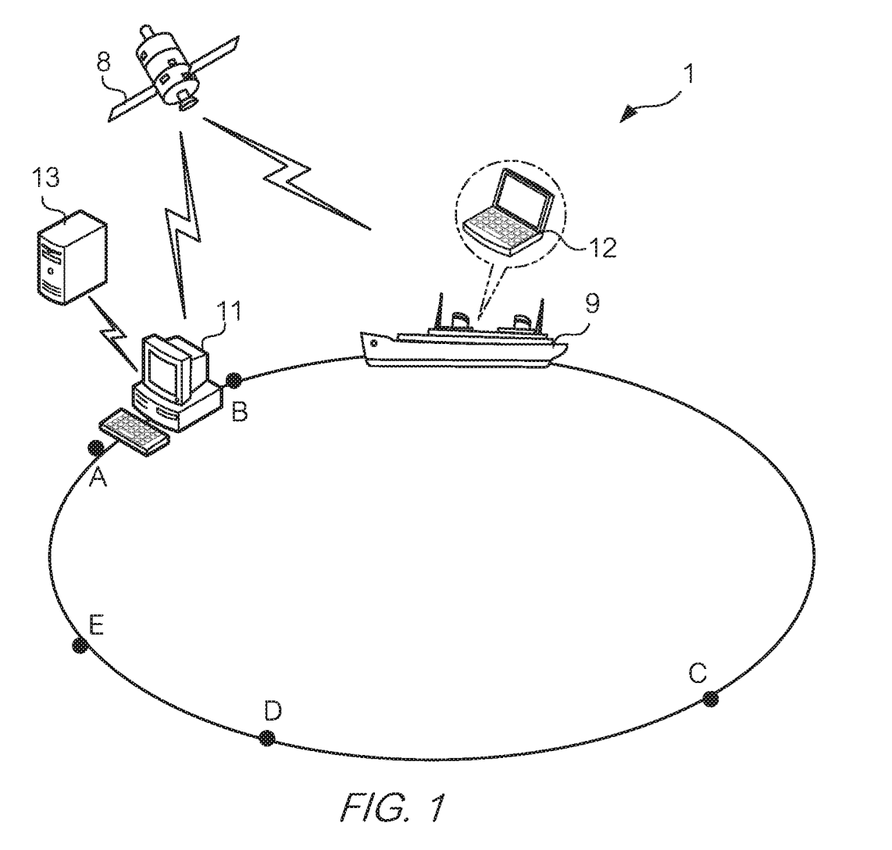
FIG. 1 A drawing illustrating an overall configuration of the fuel consumption analysis support system as in one embodiment.

FIG. 1 is a drawing schematically illustrating the overall configuration of fuel consumption analysis support system 1. Fuel consumption analysis support system 1 is provided with a terminal device 11 that is operated by a ship operation manager, for example, a terminal device 12 mounted on a ship 9 and that is operated by a ship navigator, for example, and a server device 13 that transmits data pertaining to past weather/marine conditions (hereafter referred to as "weather and marine data") to terminal device 11 in accordance with a request from terminal device 11. Terminal device 12 wirelessly transmits actual data indicating actual fuel consumption or the like in an actual voyage R of ship 9 to terminal device 11 via a communication satellite 8.

FIG. 1 exemplifies a state of performing voyage R, in which ship 9 departs port A, which is the departure point, and subsequently calls at port B, port C, port D and port E in that order and performs loading, unloading and the like, before arriving at port A, which is the destination. As an example, a case pertaining to fuel consumption amount analysis support system 1 performing support of an analysis of fuel consumption for voyage R is explained below.

Figure 2:
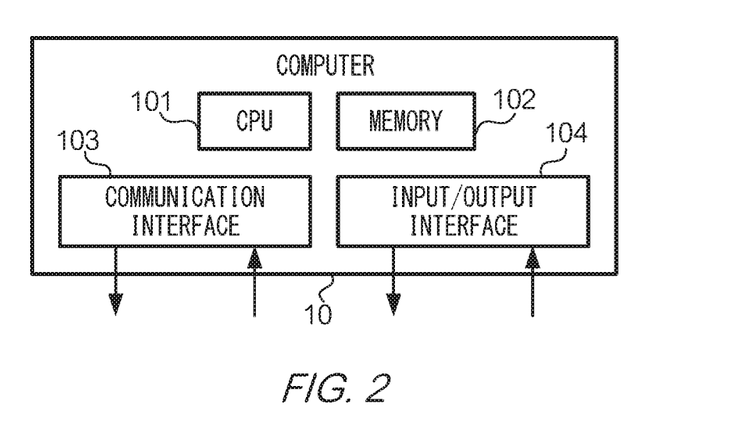
FIG. 2 A drawing illustrating a configuration of the computer used as the hardware of the terminal device and server device as in one embodiment.

With regard to fuel consumption analysis support system 1, the hardware configuration of terminal device 11, terminal device 12 and server device 13 is a general computer provided with a communication unit that performs data communication with other devices. FIG. 2 is a drawing illustrating the configuration of a computer 10 that is used as the hardware of terminal device 11, terminal device 12 and server device 13.

Computer 10 is provided with a CPU 101 that performs various arithmetic operations in accordance with the OS or a program such as an application program while controlling other components, a memory 102 that stores the program with a variety of data, a communication interface 103, which is an interface that transmits and receives a variety of data to and from other devices, and an input/output interface 104, which is an interface that performs input and output of a variety of data to and from an operation device such as a keyboard or a mouse, or a display (display device) or the like.

Terminal device 12 is provided with, as functional components, an acquisition unit that acquires data indicating conditions (wind direction, wind speed, wave height and the like) pertaining to weather and marine conditions that ship 9 actually encountered during voyage R, or the actual draught, trim, sailing speed and fuel consumption amount, and a transmission unit that transmits the data acquired by the acquisition unit as actual data to terminal device 12 via communication satellite 8. Terminal device 12 is also provided with a receiving unit that receives output data (described below) transmitted from terminal device 11 via communication satellite 8, and an output unit that outputs the content of the output data received by the receiving unit to a display or the like. That is, computer 10, which is the hardware of terminal device 12, functions as a device provided with the above acquisition unit, transmission unit, receiving unit and output unit by executing a process according to an application program for terminal device 12 as in the present embodiment.

Server device 13 is provided with, as functional components, a storage unit that stores weather and marine data (described below) indicating conditions (wind direction, wind speed, wave height and the like) pertaining to the weather and marine conditions in a particular sea area within a particular time range in relation to various combinations of time ranges and sea areas, a receiving unit that receives, from terminal device 11, transmission request data that specifies a sea area and time range, a search unit that searches weather and marine data corresponding to the combination of sea area and time range specified by the transmission request data received by the receiving unit from among the weather and marine data stored by the storage unit, and a transmission unit that transmits, to terminal device 11, which is the request source, the weather and marine data searched by the search unit. That is to say, computer 10, which is the hardware of server device 13, functions as a device provided with the storage unit, receiving unit, search unit and transmission unit by executing a process in accordance with an application program for server device 13 as in the present embodiment.

Figure 3:
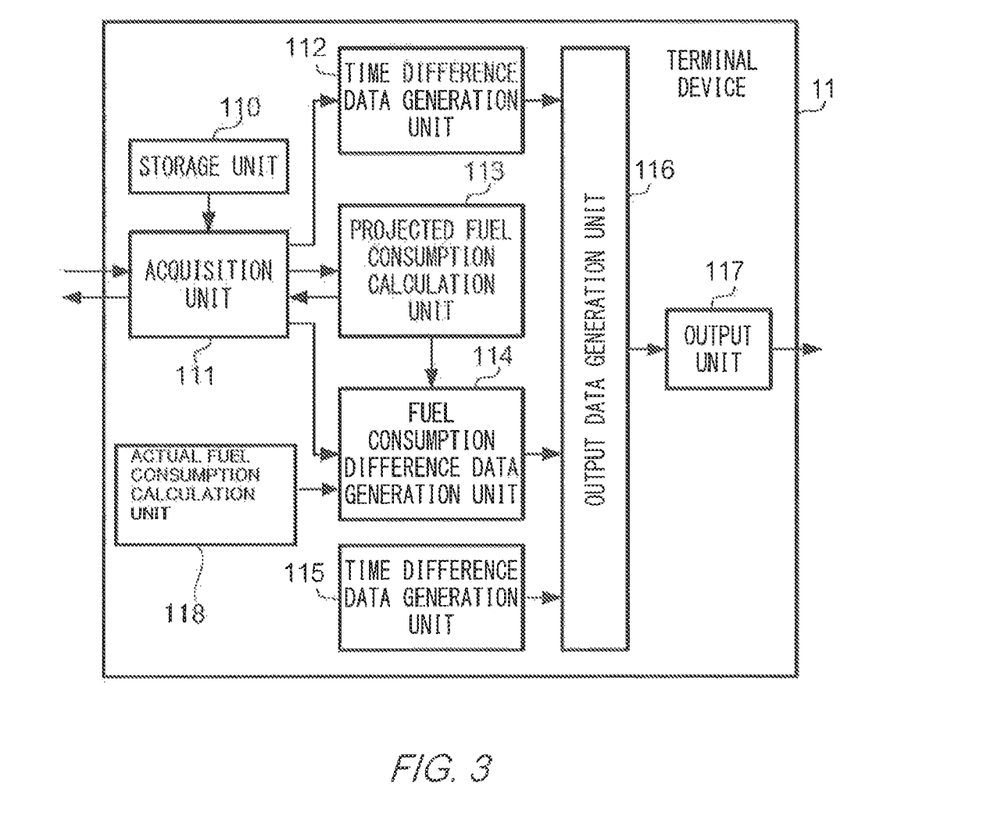
FIG. 3 A block diagram illustrating a functional configuration of the terminal device as in one embodiment.

FIG. 3 is a block diagram illustrating the functional configuration of terminal device 11. That is to say, computer 10, which is the hardware of terminal device 11, functions as a device provided with the components illustrated in FIG. 3 by executing a process in accordance with an application program for terminal device 11 as in the present embodiment.

Terminal device 11 is provided with, as a functional component, a storage unit 110 that stores, in advance, reference data indicating a schedule that serves as a reference for voyage R and fuel consumption amount data according to speed indicating fuel consumption at each of various speeds when ship 9 is navigated under various sailing conditions (for example, fuel consumption amount, ton/mile per unit sailing distance), and storing data indicating the actual amount of fuel consumption and the like received from terminal device 12 and weather and marine data received from server device 13.

Figure 4:
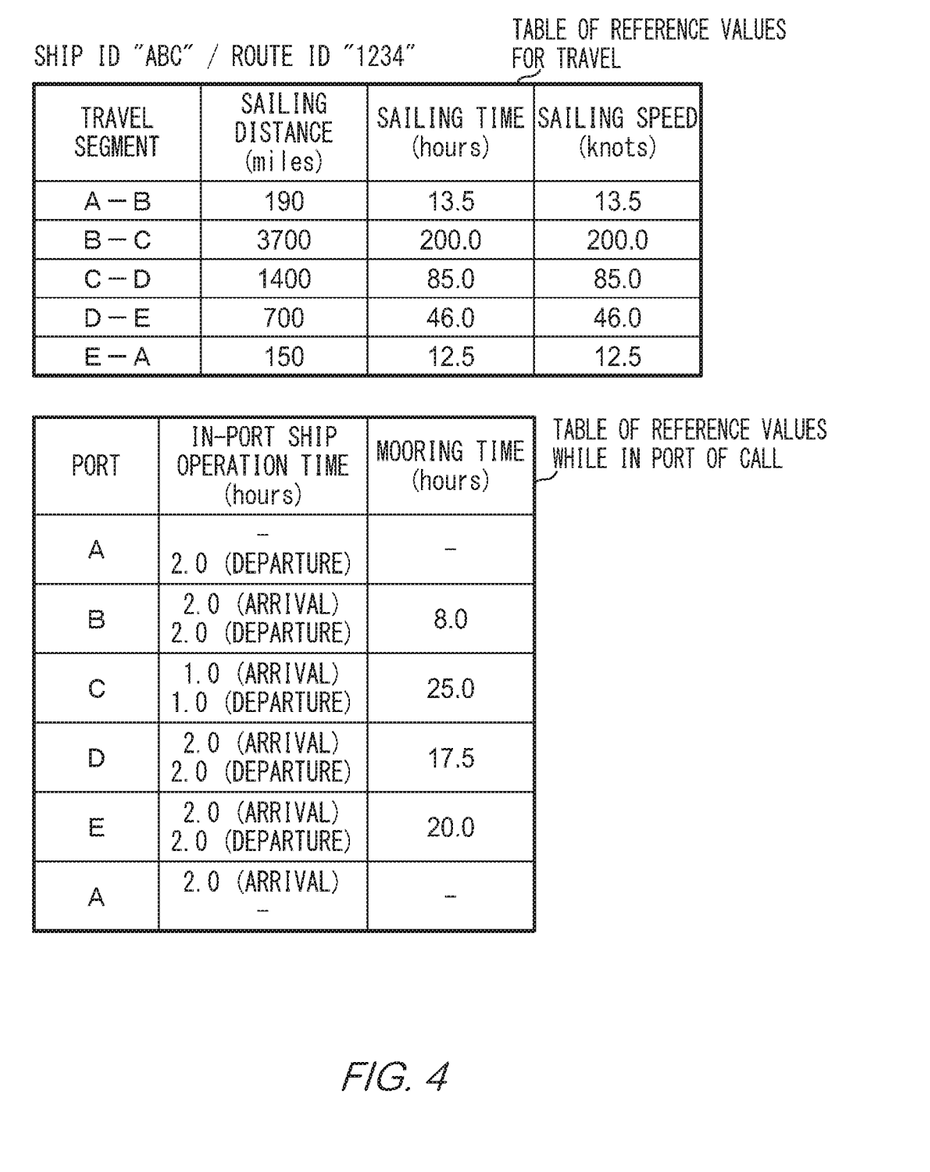
FIG. 4 A drawing exemplifying reference data stored in the terminal device as in one embodiment.

FIG. 4 is a drawing exemplifying reference data pertaining to voyage R stored by storage unit 110. The reference data is prepared in relation to each of a combination of ships identified by ship IDs and sailing routes identified by route IDs. In the example in FIG. 4, ship 9 is identified by ship ID "ABC" and the sailing route or voyage R is identified by route ID "1234".

The reference data includes a table indicating distance, sailing speed and sailing time that serve as references in relation to each of the journeys between the ports indicated in the travel segments (hereafter referred to as "table of reference values for travel"), and a table indicating in-port ship operation time and mooring time that serve as references in relation to each of the ports that are ports for relaying and the destination (hereafter referred to as "table of reference values while in port of call"). In-port ship operation time signifies the time required to sail through a body of water in which the ship speed or sailing route is limited, such as in a port or in a bay. The offshore waiting time before docking is also included herein. If two parameters from among the distance, sailing speed and sailing time indicated by the table of reference values for travel are determined, the other parameter can be determined unambiguously; therefore, the table of reference values for travel may indicate only two of the three parameters.

The reference data is data indicating a voyage schedule planned by a ship operation manager and input by the ship operation manager into terminal device 11 in advance, for example.

Figure 5:
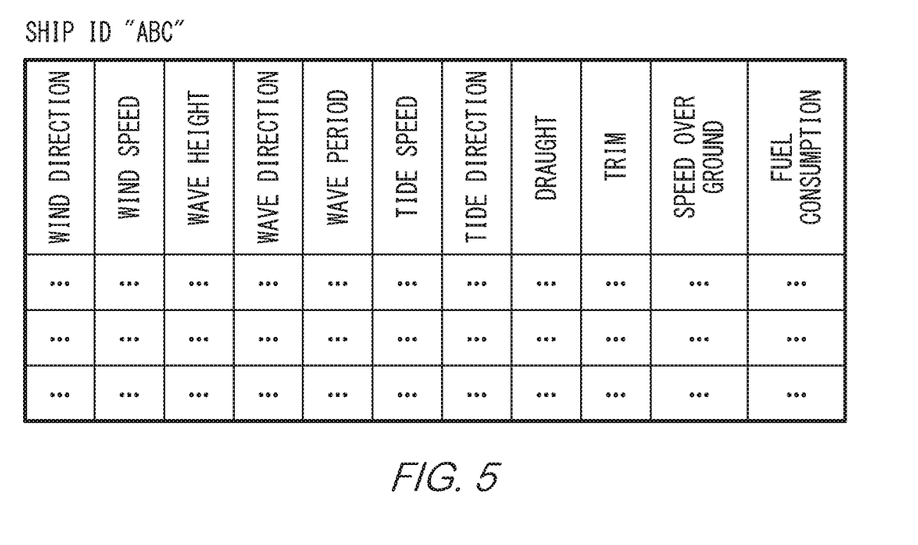
FIG. 5 A drawing illustrating data structure of the fuel consumption amount data stored in the terminal device as in one embodiment.

FIG. 5 is a drawing illustrating the data structure of the fuel consumption data at each of various speeds stored by storage unit 110. The fuel consumption data is provided with the categories wind direction, wind speed, wave height, wave direction, wave period, tide speed, tide direction, draught, trim and sailing speed (speed over ground, for example), for example, as sailing conditions of ship 9, and indicates the fuel consumption when a voyage is performed at the indicated sailing speed under the conditions indicated in the categories from wind speed to trim.

The fuel consumption data at each of various speeds is data generated by inputting various combinations of parameters (wind speed to sailing speed) in a physical simulation model of ship 9 (since the relevant technology is known, explanation thereof is omitted) and recording the fuel consumption calculated by a computer, for example.

Figure 6:
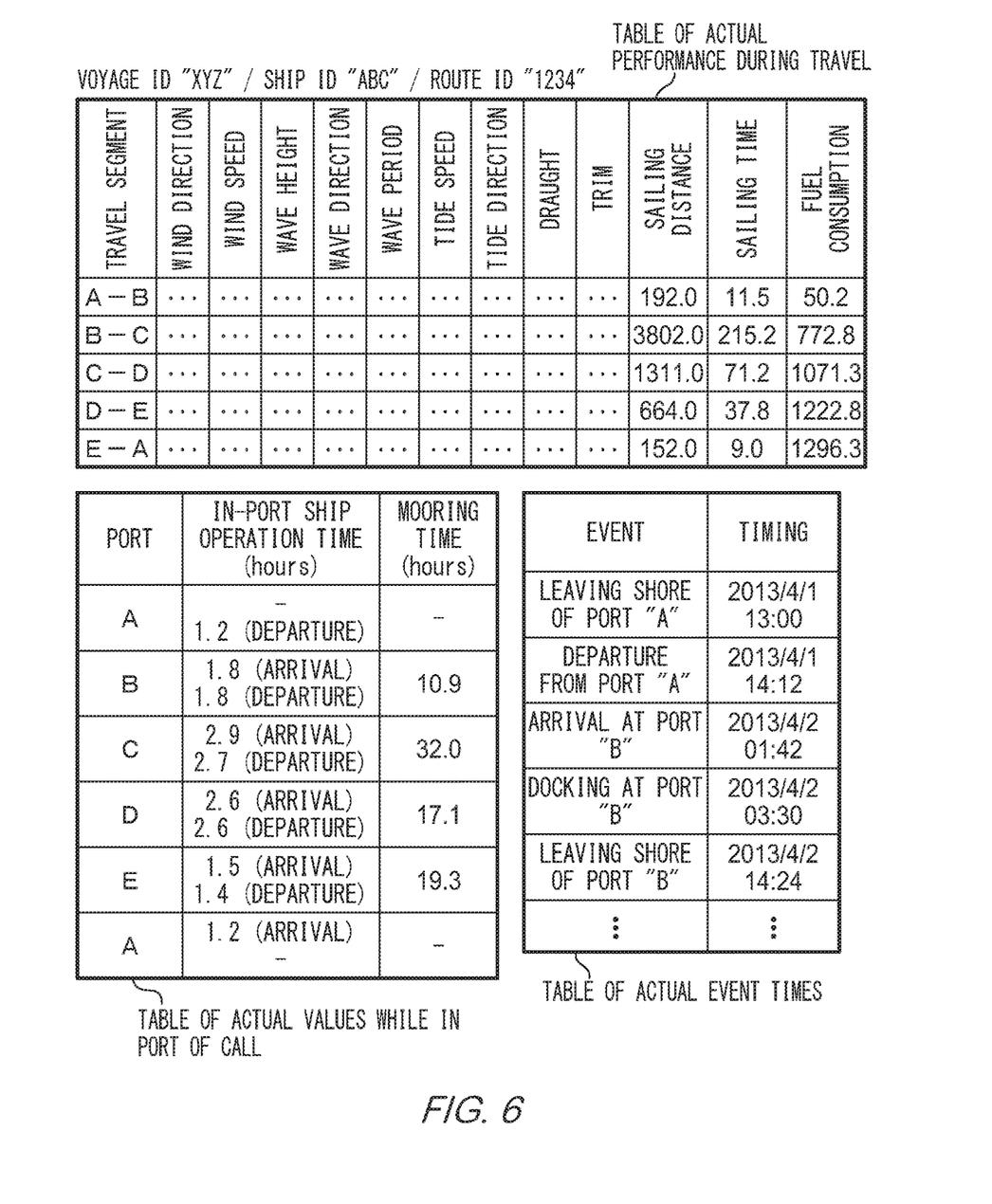
FIG. 6 A drawing illustrating data structure of the actual data stored in the terminal device as in one embodiment.

FIG. 6 is a drawing illustrating the data structure of actual data transmitted from terminal device 12 to terminal device 11 and stored by storage unit 110. However, FIG. 6 illustrates specific data examples for a part of the data. The actual data includes a table indicating the actual values of fuel consumption and the like for travel between ports (hereafter referred to as "table of actual performance during travel"), a table indicating the actual performance value of mooring time and the like at a port (hereafter referred to as "table of actual values while in port of call"), and a table indicating the actual event times of the start or end time of travel between ports or in-port ship operation, mooring and the like at a port (hereafter referred to as "table of actual event times").

The table of actual performance during travel, excluding a feature in which the categories sailing distance, sailing time and fuel consumption are provided in place of the categories sailing speed and fuel consumption in the table of reference values for travel (FIG. 4), is provided with categories similar to the categories shown in the table of reference values for travel. However, the values of each of the categories indicated in the table of actual performance during travel indicate the sailing conditions and the like encountered by ship 9 during an actual voyage R. Further, the table of actual performance during travel does not include sailing speed, but sailing speed is calculated from sailing distance and sailing time. Actual performance data is data indicating values (wind speed and the like) measured by various sensors and automatically input to terminal device 12, or values (draught, trim and the like) confirmed by visual observation or the like and manually input to terminal device 12 by a ship navigator or the like.

The table of actual performance during travel indicates the actual performance of each of the categories in relation to each of the journeys between ports indicated in the travel segments.

The table of actual values while in port of call is provided with a table of reference values while in port of call (FIG. 4) and similar categories. However, the values of each of the categories indicated in the table of actual values while in port of call are times actually measured on ship 9.

The table of actual event times includes data indicating the actual measured event times during voyage R for each of "departure from port A" (start of travel between A and B), "arrival at port B" (end of travel between A and B/start of ship operation within port B (at time of arrival at port)), "end of ship voyage within port B (at time of arrival at port)" (start of mooring at port B), "start of ship operation within port B (at time of departure from port)" (end of mooring at port B), "departure from port B" (start of travel between B and C), etc.

Figure 7:
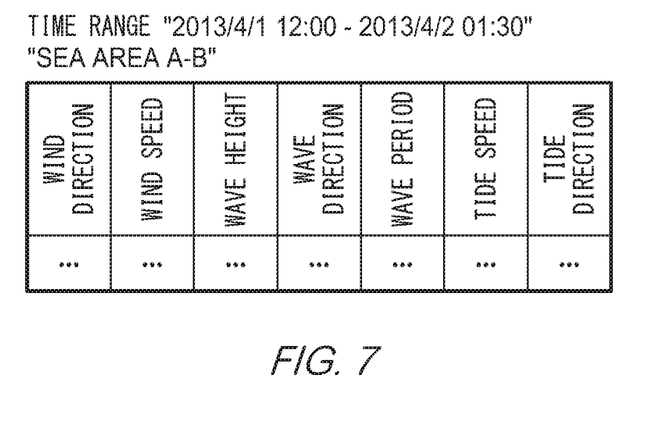
FIG. 7 A drawing illustrating data structure of the weather and marine data transmitted from the server device to the terminal device and stored in the terminal device as in one embodiment.

FIG. 7 is a drawing illustrating the data structure of the weather and marine data transmitted from server device 13 to terminal device 11 in accordance with a transmission request from terminal device 11 and stored by storage unit 110. The weather and marine data is data indicating conditions (wind direction, wind speed, wave height and the like) pertaining to the weather and marine conditions in a specific sea area in a specific past time range. Server device 13 manages a database that stores weather and marine data relating to combinations of various time ranges and sea areas, and if transmission request data that specifies a time range and sea area is received from terminal device 11, transmits the specified time range and weather and marine data to terminal device 11, the source of the request, in accordance with said transmission request data.

Explanation of the functional configuration of terminal device 11 is continued whilst referring to FIG. 3. Terminal device 11 is provided with an acquisition unit 111 that acquires actual performance data transmitted from terminal device 12, acquiring weather and sea data transmitted from server device 13 and reading the reference data and fuel consumption amount data according to speed from storage unit 110. Acquisition unit 111 also acquires projected time of departure from port data input by a user of terminal device 11 such as a ship operation manager. The projected time of departure from port data is data indicating time of departure from port A, planned in voyage R.

Terminal device 11 is also provided with a time difference data generation unit 112 that calculates the difference between the travel time that serves as a reference for each or the port-to-port segments indicated by the reference data (FIG. 4) acquired by acquisition unit 111 (hereafter referred to as "projected travel time") and the actual travel time for each of the port-to-port segments indicated by the actual performance data (FIG. 6) (hereafter referred to as "actual travel time"), calculating the difference between the mooring time that serves as a reference for each of the ports indicated by the reference data (FIG. 4) acquired by acquisition unit 111 (hereafter referred to as "projected mooring time") and the actual mooring time for each of the ports indicated by the actual performance data (FIG. 6) (hereafter referred to as "actual mooring time"), and calculating the difference between the in-port ship operation time that serves as a reference for each of the ports indicated by the reference data (FIG. 4) acquired by the acquisition unit 111 (hereafter referred to as "projected in-port ship operation time") and the actual in-port ship operation time for each of the ports indicated by the actual performance data (FIG. 6) (hereafter referred to as "actual in-port ship operation time"), and generating time difference data indicating the results thereof.

Further, terminal device 11 is provided with a projected fuel consumption calculation unit 113 that calculates a fuel consumption amount that serves as a reference, which is necessary during each of the segments of travel between ports (hereafter referred to as "projected fuel consumption"). Projected fuel consumption calculation unit 113 first specifies the time of departure from port A for planned voyage R indicated by the projected time of departure from port data acquired by acquisition unit 111. Next, projected fuel consumption calculation unit 113 specifies a period that serves as a reference for each of the segments of travel between ports by adding the sailing time necessary for travel between ports indicated in the table of reference values for travel of the reference data (FIG. 4) and the in-port ship operation time and mooring time necessary at each of the ports indicated in the table of reference values while in port of call, in order, to the time of departure from port A that serves as a reference. A period that serves as a reference specified as such is a time range in which travel between ports was performed previously in accordance with the voyage schedule indicated by the reference data.

Next, projected fuel consumption calculation unit 113 generates transmission request data including data indicating, for each of the port-to-port segments, the sea area of said port-to-port segment and a travel period (time range) that serves as a specified reference, and passes on the data to acquisition unit 111. Acquisition unit 111 transmits the transmission request data to server device 13, acquires weather and marine data that is transmitted by server device 13 as a response thereto, and passes on the data to projected fuel consumption calculation unit 113.

Projected fuel consumption calculation unit 113, when weather and marine data is received from acquisition unit 111 as described above, extracts a data record that stores conditions indicating weather and marine data in data fields "wind direction" to "tide direction," stores draught and trim indicated by the actual performance data (FIG. 6) in data fields "draught" and "trim," and stores sailing speed indicated by the table of reference values for travel of the reference data (FIG. 4) in the data field "speed over ground"

from among a plurality of data records of the fuel consumption data according to speed (FIG. 5) for each of the port-to-port segments. Projected fuel consumption calculation unit 113 calculates projected fuel consumption pertaining to each of the journeys between ports by multiplying the value stored in the data field "fuel consumption" of the data record extracted as such by the sailing distance indicated by the table of reference values for travel of the reference data (FIG. 4). Projected fuel consumption calculation unit 113 generates projected fuel consumption data indicating projected fuel consumption pertaining to each of the journeys between ports calculated as such.

Terminal device 11 is provided with a fuel consumption difference data generation unit 114 that calculates the difference between projected fuel consumption indicated by projected fuel consumption data generated by projected fuel consumption calculation unit 113 and the actual fuel consumption indicated in the table of actual performance during travel of the actual performance data (FIG. 6) acquired by acquisition unit (hereafter referred to as "actual fuel consumption"), and generating fuel consumption difference data indicating the results thereof.

Further, terminal device 11 is provided with a time difference data generation unit 115 that calculates the difference between a time that serves as a reference and a time that is actually measured (actual time) for each of the start or end times of in-port ship operation and mooring during travel between ports and at a port, and generating time difference data indicating the results thereof. Specifically, time difference data generation unit 115 specifies a time that serves as a reference by adding the time that serves as a reference for each of the journeys between ports and mooring at a port indicated by the reference data (FIG. 4), in order, to the planned time of departure from port A indicated by the reference time of departure from port data acquired by acquisition unit 111, and calculates the difference between the time that serves as a reference specified as such and the measured time indicated by the table of actual event times of the actual performance data.

Further, terminal device 11 is provided with an output data generation unit 116 that generates output data indicating the difference between the projected travel time for each of the journeys between ports and the actual travel time indicated by the time difference data generated by time difference data generation unit 112, the difference between the projected mooring time for each of the ports and the actual mooring time, the difference between the projected in-port ship operation time for each of the ports and the actual in-port ship operation time, the difference between the projected fuel consumption pertaining to each of the travels between ports indicated by the fuel consumption difference data generated by fuel consumption difference data generation unit 114 and the actual fuel consumption, and the difference between the time that serves as a reference for each of the start or end times of in-port ship operation and mooring during travel between ports and at ports indicated by the time difference data generated by time difference data generation unit 115.

FIG. 8 is a drawing exemplifying output data generated by output data generation unit 116. The output data indicates the time that serves as a reference, actual time and the difference between said times for each of the in-port ship operations and mooring during travel between ports and at ports. Further, the output data indicates the projected fuel consumption, actual fuel consumption, the difference between them and the accumulated value of said differences for each of the journeys between ports. Furthermore, the output data indicates the difference between the time that serves as a reference and the actual time for each of leaving shore, departure from port, arrival at port and docking at each of the ports (start or end time of in-port ship operation and mooring during travel between ports and at the ports).

Furthermore, terminal device 11 is provided with an output unit 117 that outputs output data generated by output data generation unit 116. Output unit 117 outputs the output data to a display connected to terminal device 11, for example. In such a case, output data generation unit 116 generates the output data as image data that illustrates the content of the data, and passes on the data to output unit 117. The content of the output data output to the display can be viewed by a user of terminal device 11 such as a ship operation manager. Output unit 117 outputs the output data to a communication interface 103, for example, and transmits the data to terminal device 12 via communication satellite 8. In such a case, the output data is received by terminal device 12 and converted to image data that illustrates the content thereof in terminal device 12, for example, and subsequently is output to a display connected to terminal device 12. The content of the output data output to the display can be viewed by a user of terminal device 12 such as a ship navigator.

According to the content of the output data exemplified in FIG. 8, a user such as a ship operation manager or a ship navigator is able to ascertain the causal relationship between the time allocation and fuel consumption during travel between ports or mooring in voyage R as described below, for example.

(1) At port A, there was a mooring extension of 3 hours, and the time of departing from port A was delayed when compared to the reference value. Since the speed was increased to be faster than the reference value in the journey between port A and port B, the time of arrival at port B was delayed by 0.2 hours compared to the reference value (the delay was shortened). Due to the speed increase between port A and port B, there was extra fuel consumption of 8.0 tons when compared to the reference value.

(2) At port B, there was a mooring extension of 2.9 hours, and the time of leaving shore from port B was delayed by 2.9 hours. The speed could not be increased during travel between port B and port C (probably due to the ship encountering rough weather conditions), and the time of arrival at port C was greatly delayed, by 17.9 hours, when compared to the reference value. Due to speed reduction between port B and port C, the fuel consumption was 55.1 tons less than the reference value.

(3) At port C, there was a mooring extension of 7.0 hours, and the time of leaving shore from port C was delayed by 26.8 hours when compared to the reference value. Since the speed was increased for travel between port C and port D to regain some of the lost time, the time of arrival at port D was delayed by 14.7 hours compared to the reference value (the delay was shortened). Due to the speed increase between port C and port D, there was extra fuel consumption of 53.0 tons when compared to the reference value.

(4) At port D, there was no mooring extension, but the time of departing from port D was delayed by 14.9 hours compared to the reference value. Since the speed was increased during the journey between port D and port E to regain some of the lost time, the time of arrival at port E was delayed by 7.3 hours (delay was shortened). Due to the speed increase between port D and port E, there was extra fuel consumption amount of 24.3 tons when compared to the reference value.

(5) At port E, there was no mooring extension, but the time of leaving shore from port E was delayed by 6.1 hours when compared to the reference value. Since the speed was increased during the journey between port E and port A to regain some of the lost time, the time of arrival at port A was delayed by 2.0 hours (the delay was shortened). Due to the speed increase between port E and port A, there was extra fuel consumption of 13.2 tons when compared to the reference value.

(6) As described above, due to the two points, i.e. mooring extension at port A, port B and port C, and a long time being required for travel between port B and port C, there was no option but to increase the speed of each of the journeys between port A and port B, between port C and port D and between port D and port E, and as a result, overall extra fuel consumption was 43.4 tons when compared to the reference value.

As described above, according to fuel consumption analysis support system 1, a user such as a ship operation manager or a ship navigator is able to ascertain easily the causal relationship of the time allocation that was necessary during travel between ports, mooring at ports and the like in an actual voyage of a ship that was performed and the increase and decrease in fuel consumption that accompanies the increase and decrease in speed during travel between ports.

Modified Examples

The embodiment described above may be modified to various examples within the scope of the technical ideas of the present invention. Such modified examples are indicated below.

(1) The content indicated by the output data generated and output by terminal device 11 are not limited to the content exemplified in FIG. 8, and for example, may include other information such as the ratio of the difference between the projected fuel consumption and actual fuel consumption with respect to the projected fuel consumption, and further, information of low importance may be omitted. The display mode of the content indicated by the output data is not limited to table format, and may be another mode, such as a graph.

Figure 9:
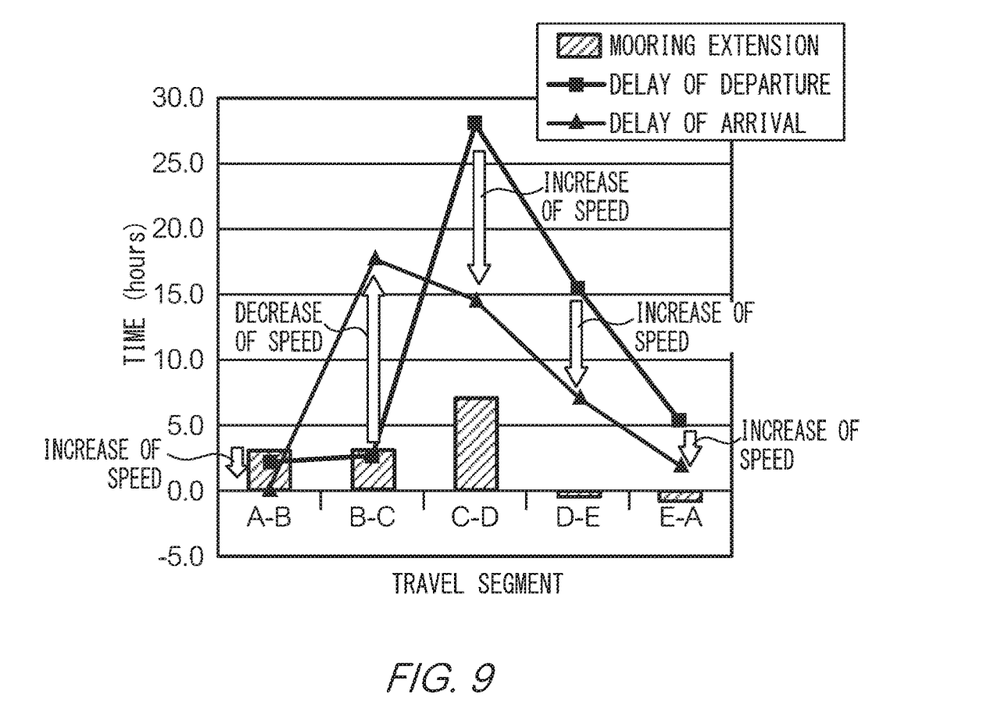
FIG. 9 An example of a graph illustrating content of the output data generated by the terminal device as in a modified example.
Figure 10:
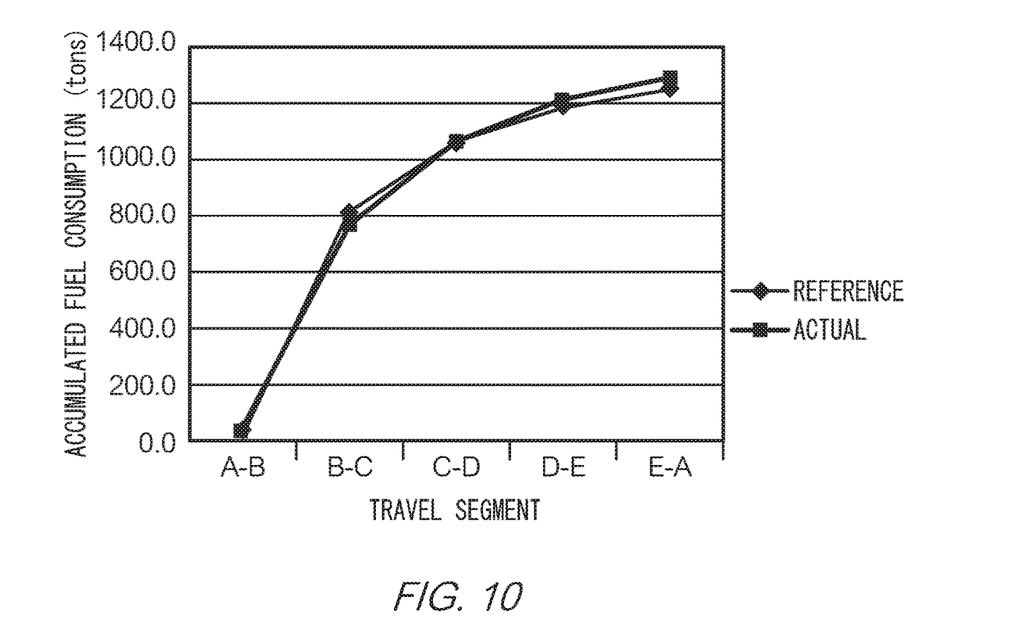
FIG. 10 An example of a graph illustrating content of the output data generated by the terminal device as in a modified example.

FIG. 9 and FIG. 10 are drawings illustrating an example in which the content of the output data is displayed on a graph. In the graph shown in FIG. 9, increase and decrease in mooring time at each port with respect to the reference value are indicated by a bar graph. The bar graph corresponding to "A-B" corresponds to the mooring time at port A, and the bar graph corresponding to "B-C" corresponds to the mooring time at port B, etc.

In the graph shown in FIG. 9, the delay times (positive direction) with respect to the reference values are indicated by a line graph for each of the times of arrival at port and times of departure from port for each of the ports. The values on the line graph indicating the delay in time of departure from port corresponding to "A-B" indicate delay in time of departure from port A, those corresponding to "B-C" indicate delay in time of arrival at port B, etc. Accordingly, When the delay in time of arrival at a port is greater than the delay in time of departure from a port, it can be ascertained that the speed of travel between those ports was reduced when compared to the reference value (the journey took more than the projected period of time), and when the delay in time of departure from a port is greater than the delay in time of arrival at a port, it can be ascertained that the speed of travel between those ports was increased compared to the reference value (the journey took less than the projected period of time).

When viewing the graph shown in FIG. 9, it can be ascertained intuitively that there was no option but to increase the speed of travel between the other ports due to the mooring time being extended at port A, port B and port C, and a long time being needed for travel between port B and port C in the bar graph.

FIG. 10 is a line graph indicating, for each of projected fuel consumption and measured fuel consumption, the accumulated value thereof is indicated in the state after travel between each of the ports. The fuel consumption corresponding to "A-B" indicates the accumulated value of the fuel consumption at the point in time when travel between port A and port B is complete, the fuel consumption corresponding to "B-C" indicates the accumulated value of the fuel consumption at the point in time in which travel between port B and port C is complete, etc.

When viewing the graph shown in FIG. 10, it can be ascertained intuitively that the accumulated fuel consumption at the point in time in which travel between port B and port C is complete could be less than the reference value, but since the speed of travel had to be increased thereafter to mitigate the delay, there was inevitably extra accumulated fuel consumption when compared to the reference value as a result.

(2) In the embodiment described above, the fuel consumption data according to speed served as data generated using a physical simulation model pertaining to ship 9, but the method for generating the fuel consumption data according to speed is not limited thereto. For example, the data may be data generated by statistically processing parameters and fuel consumption actually measured in a previous voyage of ship 9, data generated by amending the data generated using the physical simulation model or the like with the data acquired by statistically processing the parameters and fuel consumption actually measured in a previous voyage of ship 9, or the like.

(3) In the embodiment described above, the fuel consumption data according to speed served as data in table form as illustrated in FIG. 5, but may be any type of data that is data that indicates fuel consumption corresponding to a combination of various parameters pertaining to sailing conditions, such as data indicating a function formula that uses the values of the wind direction to sailing speed, for example, as variables to calculate fuel consumption.

(4) In the embodiment described above, the fuel consumption data according to speed (FIG. 5), actual performance data (FIG. 6) and weather and marine data (FIG. 7) were provided with the categories wind direction, wind speed, wave height etc. as conditions pertaining to weather and marine conditions, but the categories can be changed as appropriate. Further, a configuration in which the fuel consumption data according to speed and actual performance data is provided with a condition, unrelated to weather and marine conditions, of influence on fuel consumption of ship 9 such as fouling on the hull or propeller as a category may be adopted. Further, weather and marine conditions do not necessarily need to be taken into consideration. When weather and marine conditions are not taken into consideration, server device 13 is not necessary.

(5) In the embodiment described above, weather and marine data terminal device 11 acquired from server device 13 is used when calculating a projected fuel consumption. This weather and marine data indicates weather and marine conditions estimated to be encountered by ship 9 when a voyage is performed following a voyage schedule according to the data of projected time of departure from port and the reference data, and does not necessarily match the weather and marine conditions encountered by ship 9 in voyage R that was actually performed by ship 9. However, as long as the voyage schedule of voyage R that was actually performed does not greatly differ from the voyage schedule that serves as a reference (for example, approximately a few days), the weather and marine conditions estimated to be actually encountered by ship 9 when navigated in accordance with the voyage schedule that serves as a reference do not greatly differ from the weather and marine conditions actually encountered by ship 9 in voyage R. Accordingly, a configuration may be adopted in which projected fuel consumption calculation unit 113 of terminal device 11 calculates projected fuel consumption using the weather and marine conditions indicated by the actual performance data in place of the weather and marine data acquired from server device 13. In such a case, server device 13 is not necessary.

(6) In the embodiment described above, the projected fuel consumption is calculated by projected fuel consumption calculation unit 113, but in place thereof, a configuration may be adopted in which, for example, the average value of the actual fuel consumption of a previous voyage that was actually performed by the same ship 9 on the same route, the actual fuel consumption in which the fuel consumption was the minimum from among previous voyages that were actually performed by the same ship 9 on the same route, or the like is used.

(7) In the embodiment described above, fuel consumption difference data generation unit 114 use fuel consumption measured by a sensor such as a fuel flow meter on ship 9 as actual fuel consumption (fuel consumption indicated by the actual performance data) when calculating the difference between the projected fuel consumption and the actual fuel consumption. In place thereof, a configuration in which terminal device 11 is provided with an actual fuel consumption calculation unit 118 that calculates fuel consumption using a method similar to that of projected fuel consumption calculation unit 113 based on conditions pertaining to weather and marine conditions and the like indicated by the actual performance data or conditions such as draught, trim, sailing distance and sailing speed, and fuel consumption difference data generation unit 114 uses the fuel consumption calculated by the actual fuel consumption calculation unit 118 as actual fuel consumption may be adopted.

(8) In the embodiment described above, the actual performance data includes weather and marine conditions acquired by measuring or the like in voyage R that was actually performed, but a configuration in which terminal device 11 acquires, from server device 13, weather and marine data corresponding to each sea area and time range thereof in which voyage R was performed, and uses weather and marine conditions indicated by the weather and marine data acquired from server device 13 in place of weather and marine conditions acquired by measuring or the like on ship 9 may be adopted.

(9) In the embodiment described above, the reference data serves as data indicating a voyage schedule planned by a ship operation manager, but the data may be any data indicating a voyage schedule for comparison, such as data indicating the average value of a voyage schedule in a previous voyage that was actually performed by the same ship 9 on the same route, or data indicating a voyage schedule in which the fuel consumption was the minimum from among previous voyages that were actually performed by the same ship 9 on the same route, for example.

(10) In the embodiment described above, a travel segment signifies port-to-port as one unit, and sailing time, sailing distance, sailing speed, fuel consumption amount and the like were measured, calculated or the like with respect to said unit. In place thereof, a configuration may be adopted in which a port-to-port travel segment is divided into a plurality of segments, and each of the plurality of divided travel segments serves as one unit to measure, calculate or the like sailing time, sailing distance, sailing speed, fuel consumption amount and the like. In such a case, a user is able to obtain more detailed information such as, in a journey between port B and port C, there was a decrease in speed in the first half, but the speed was greatly increased in the second half, causing the fuel consumption to increase in the second half.

(11) In the embodiment described above, the sailing speed is set to be speed over ground, but speed through water may be used as the sailing speed in place of speed over ground. Further, in the embodiment described above, fuel consumption is set as fuel consumption per unit distance traveled (ton/mile), but fuel consumption per unit time (ton/day) may be used as fuel consumption.

(12) In the embodiment described above, a configuration in which terminal device 11, terminal device 12 and server device 13 are realized by executing a process according to an application program in a general computer is adopted. In place thereof, one or more of terminal device 11, terminal device 12 and server device 13 may be configured as so-called dedicated devices.

The present invention comprises each of: the device exemplified in terminal device 11; a program that causes a computer to function as terminal device 11; a computer-readable recording medium that continuously records said program; and a processing method executed by terminal device 11.

EXPLANATION OF REFERENCE NUMERALS

1 . . . fuel consumption amount analysis support system, 8 . . . communication satellite, 9 . . . ship, 10 . . . computer, 11 . . . terminal device, 12 . . . terminal device, 13 . . . server device, 101 . . . CPU, 102 . . . memory, 103 . . . communication interface, 104 . . . input/output interface, 110 . . . storage unit, 111 . . . acquisition unit, 112 . . . time difference data generation unit, 113 . . . projected fuel consumption calculation unit, 114 . . . fuel consumption difference data generation unit, 115 . . . time difference data generation unit, 116 . . . output data generation unit, 117 . . . output unit

What is claimed is:
1. A device comprising:
an acquisition unit in communication with a ship, wherein the acquisition unit acquires, for a voyage of the ship including mooring at one or more relay ports between a departure port and destination port, data indicating a projected travel time between ports, a projected mooring time at a relay port, projected fuel consumption which is fuel consumption required for travel between ports, and a distance between ports, and receives data transmitted from the ship indicating an actual travel time between ports, an actual mooring time at a relay port, and an actual fuel consumption required for travel between ports according to a speed of the ship, wherein the projected fuel consumption is calculated based on the projected travel time, the distance between the ports, the fuel consumption according to speed, and a speed based on anticipated weather or marine condi- tions in one or more sea areas between the departure port and the destination port;

a time difference data generation unit that generates time difference data, the time difference data including a time difference between the projected travel time and the actual travel time and a difference between the projected mooring time and the actual mooring time based on data acquired by the acquisition unit;

a fuel consumption difference data generation unit that generates fuel consumption difference data indicating a difference between the projected fuel consumption data and the actual fuel consumption data based on the data acquired by the acquisition unit; and an output unit that outputs to the ship data indicated by the time difference data and the fuel consumption difference data, the output including a first graph indicating an increase or decrease in the actual mooring time at each of the ports with respect to a reference value, a second graph indicating an amount of a delay in a time of departure from each of the ports, and a third graph indicating an amount of a delay in a time of arrival at each of the ports.

2. The device according to claim 1, wherein:

the data indicating fuel consumption according to speed indicates fuel consumption according to speed in a combination of parameters related to the anticipated weather or marine conditions, the acquisition unit acquires data indicating weather or marine conditions in the voyage, and the projected fuel consumption calculation unit calculates the projected fuel consumption based on the data acquired by the acquisition unit.

3. The device according to claim 1, wherein:

the acquisition unit acquires data indicating fuel consumption according to speed of the ship, and the device further comprises an actual fuel consumption calculation unit that calculates the actual fuel consumption based on the data acquired by the acquisition unit.

4. The device according to claim 3, wherein:

the data indicating fuel consumption according to speed indicates fuel consumption according to speed in a combination of parameters related to weather or marine conditions, the acquisition unit acquires data indicating weather or marine conditions in the voyage, and the actual fuel consumption calculation unit calculates the actual fuel consumption based on the fuel consumption according to speed corresponding to the data acquired by the acquisition unit.

5. A non-transitory computer readable medium that stores a program, the program including instructions that are executed by a computer to perform:

a process for acquiring, for a voyage of a ship including mooring at one or more relay ports between a departure port and destination port, data indicating a projected travel time between ports, a projected mooring time at a relay port, projected fuel consumption which is fuel consumption required for travel between ports, and a distance between ports, the process including receiving data transmitted from a ship, the data including an actual travel time between ports, an actual mooring time at a relay port, and an actual fuel consumption required for travel between ports according to a speed of the ship, wherein the projected fuel consumption is calculated based on the projected travel time, the distance between the ports, the fuel consumption according to speed, and a speed based on anticipated weather or marine conditions in one or more sea areas between the departure port and the destination port;

a process for generating time difference data, the time difference data including a time difference between the projected travel time and the actual travel time and a difference between the projected mooring time and the actual mooring time based on data acquired in the process for acquiring;

a process for generating fuel consumption difference data indicating a difference between the projected fuel consumption data and the actual fuel consumption data based on the data acquired in the process for acquiring; and a process for outputting to the ship data indicated by the time difference data and the fuel consumption difference data, the output including a first graph indicating an increase or decrease in the actual mooring time at each of the ports with respect to a reference value, a second graph indicating an amount of a delay in a time of departure from each of the ports, and a third graph indicating an amount of a delay in a time of arrival at each of the ports.

6. A computer-readable recording medium that continuously records and stores a program, the program including instructions that are executed by a computer to perform:

a process for acquiring, for a voyage of a ship including mooring at one or more relay ports between a departure port and destination port, data indicating a projected travel time between ports, a projected mooring time at a relay port, projected fuel consumption which is fuel consumption required for travel between ports, and a distance between ports, the process including receiving data transmitted from a ship, the data including an actual travel time between ports, an actual mooring time at a relay port, and an actual fuel consumption required for travel between ports according to a speed of the ship, wherein the projected fuel consumption is calculated based on the projected travel time, the distance between the ports, the fuel consumption according to speed, and a speed based on anticipated weather or marine conditions in one or more sea areas between the departure port and the destination port;

a process for generating time difference data, the time difference data including a time difference between the projected travel time and the actual travel time and a difference between the projected mooring time and the actual mooring time based on data acquired in the process for acquiring;

a process for generating fuel consumption difference data indicating a difference between the projected fuel consumption data and the actual fuel consumption data based on the data acquired in the process for acquiring; and a process for outputting to the ship data indicated by the time difference data and the fuel consumption difference data, the output including a first graph indicating an increase or decrease in the actual mooring time at each of the ports with respect to a reference value, a second graph indicating an amount of a delay in a time of departure from each of the ports, and a third graph indicating an amount of a delay in a time of arrival at each of the ports.

7. A method comprising:

a step for acquiring, for a voyage of a ship including mooring at one or more relay ports between a departure port and destination port, data indicating a projected travel time between ports, a projected mooring time at a relay port, projected fuel consumption which is fuel consumption required for travel between ports, and a distance between ports, the step including receiving data transmitted from a ship, the data including an actual travel time between ports, an actual mooring time at a relay port, and an actual fuel consumption required for travel between ports according to a speed of the ship, wherein the projected fuel consumption is calculated based on the projected travel time, the distance between the ports, the fuel consumption according to speed, and a speed based on anticipated weather or marine conditions in one or more sea areas between the departure port and the destination port;

a step for generating time difference data, the time difference data including a time difference between the projected travel time and the actual travel time and a difference between the projected mooring time and the actual mooring time based on data acquired in the step for acquiring;

a step for generating fuel consumption difference data indicating a difference between the projected fuel consumption data and the actual fuel consumption data based on the data acquired in the step for acquiring; and a step for outputting to the ship data indicated by the time difference data and the fuel consumption difference data, the output including a first graph indicating an increase or decrease in the actual mooring time at each of the ports with respect to a reference value, a second graph indicating an amount of a delay in a time of departure from each of the ports, and a third graph indicating an amount of a delay in a time of arrival at each of the ports.

* * * * *